United States Patent
Castelijns et al.

(10) Patent No.: US 7,832,614 B2
(45) Date of Patent: Nov. 16, 2010

(54) METHOD OF EXPLOSION WELDING TO CREATE AN EXPLOSION WELDED ARTICLE HAVING A NON-PLANAR SHAPE

(75) Inventors: Stef Castelijns, Eersel (NL); Cor Smetsers, Oirschot (NL); Peter Claessens, Someren (NL); Peter Megens, Den Dungen (NL)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/119,104

(22) Filed: May 12, 2008

(65) Prior Publication Data
US 2008/0277452 A1  Nov. 13, 2008

Related U.S. Application Data

(60) Provisional application No. 60/917,504, filed on May 11, 2007.

(51) Int. Cl.
*B23K 20/08* (2006.01)

(52) U.S. Cl. .......... 228/108; 228/2.5; 228/107
(58) Field of Classification Search .......... 228/107, 228/108, 115, 116, 2.5; 72/56
See application file for complete search history.

(56) References Cited

U.S. PATENT DOCUMENTS

| | | | | | |
|---|---|---|---|---|---|
| 3,672,033 | A | * | 6/1972 | Richter | 228/107 |
| 3,696,228 | A | * | 10/1972 | Thomas et al. | 219/73.11 |
| 4,133,471 | A | * | 1/1979 | Niwatukino | 228/107 |
| 5,961,027 | A | * | 10/1999 | Szecket | 228/107 |

* cited by examiner

*Primary Examiner*—Jessica L. Ward
*Assistant Examiner*—Nicholas P D'Aniello
(74) *Attorney, Agent, or Firm*—Rader, Fishman & Grauer, PLLC

(57) ABSTRACT

An explosion welded article having a non-planar shape is provided. A method of preparing an apparatus for explosion welding is also provided, as is a method for forming an explosion welded article having a non-planar shape.

8 Claims, 3 Drawing Sheets

METHOD OF EXPLOSION WELDING TO CREATE AN EXPLOSION WELDED ARTICLE HAVING A NON-PLANAR SHAPE

BACKGROUND

Explosion welding, sometimes referred to as explosion bonding, is a process of bonding at least one metallic layer (a cladding layer) to at least one more metallic layer (a base layer). Explosion welding can cause metallurgical bonds to form between similar metallic materials as well as between dissimilar metallic materials.

An explosion welding process has been used to metallurgically bond a cladding layer to a base layer that is flat or substantially flat. The cladding layer and the flat or substantially flat base layer are first prepared for explosion welding. The cladding layer has a bonding surface that is prepared by polishing or grinding the cladding bonding surface to achieve a substantially uniform finish. The base layer has a bonding surface that is prepared for explosion welding by polishing or grinding the base bonding surface to achieve a substantially uniform finish.

The cladding layer is positioned to be substantially parallel to the flat or substantially flat base layer, spaced apart from the base layer at a predetermined standoff distance using one or more spacer mechanisms. An explosive composition is applied to at least a portion of an outer surface of the cladding layer that is opposite the cladding bonding layer. An explosive containment mechanism may be applied to the outer surface of the cladding layer. If applied, the explosive containment mechanism surrounds an explosion region on the outer surface of the cladding layer.

A detonation system is functionally connected with the explosive composition. Upon ignition or initiation of the explosive composition, an explosion travels along at a detonation rate through the explosion region, consuming the explosive composition. As the explosion travels, metallic material comprising the cladding layer collides at an angle with the base layer, resulting in an impact. The impact occurs at high pressure, and causes spalling of the cladding bonding surface and the base bonding surface. Particles created from spalling are ejected away in a jet created by the high pressure, as are surface contaminants on the cladding bonding surface and the base bonding surface.

In existing explosion welding systems, the flatness and the uniformity of the surfaces of the cladding layer and the base layer help make the chemical and physical results of the explosion predictable and manageable, despite the heat and the speed of the explosion.

Although there is much heat generated using an explosion welding process, little heat transfer occurs from the cladding layer to the base layer. The explosion welding process results in a metal-to-metal bond between the metallic material comprising the cladding layer and the metallic material comprising the base layer with little or no melting or diffusion.

DETAILED DESCRIPTION OF THE DRAWINGS

A method of making explosion welded articles that have a non-planar shape has been discovered. The explosion welded articles may have a curved shape or an irregular shape.

Figure 1:
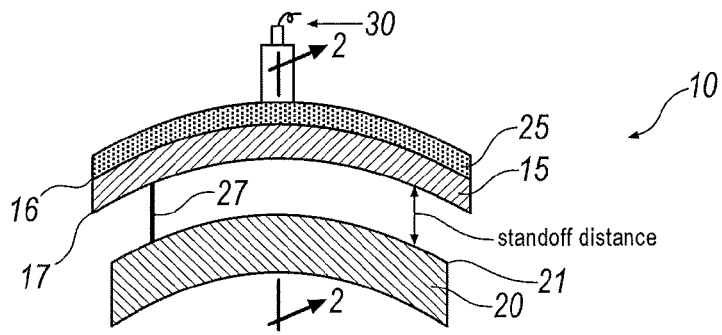
FIG. 1 is a schematic of a system for explosion welding prior to detonation.

All figures referred to herein are meant to be exemplary and non-limiting with respect to the appended claims. FIG. 1 generally depicts a schematic of an apparatus 10 for explosion welding prior to detonation. In FIG. 1, a cladding layer 15 has an outer surface 16 and a cladding bonding surface 17 opposite the outer surface 16, and a base layer 20 has a base bonding surface 21. The cladding layer 15 has a shape that is selected to substantially conform to a shape of the base bonding surface 21. The shape of the cladding layer 15 and shape of the base bonding surface 21 contains at least one curve or irregularity. The one or more curves may be constant, substantially constant or the curves may contain irregularities. The entirety of cladding layer 15 may be of a curved shape. The shape of the cladding layer 15 and the shape of the base bonding surface 21 may contain a plurality of curves wherein some curves are constant, some are substantially constant and some contain irregularities. In one exemplary illustration, the cladding layer 15 and the base bonding surface 21 are both shaped substantially like a cylinder. In another exemplary illustration, the cladding layer 15 and base bonding surface 21 have an irregular shape comprising at least one curve.

Figure 2:
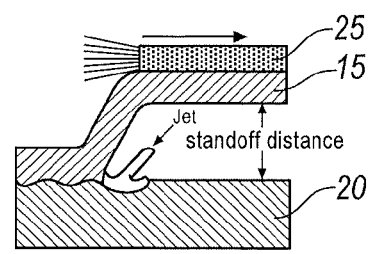
FIG. 2 is an infinitely narrow cut-away view of the system of FIG. 1 during explosion welding.
Figure 3:
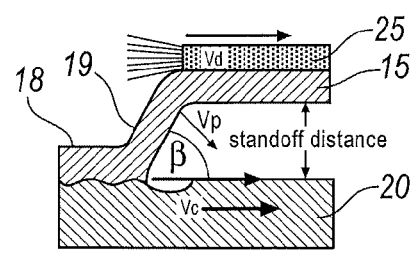
FIG. 3 is an infinitely narrow cut-away view of the system of FIG. 1 during explosion welding.

Although it is contemplated that the cladding layer 15 and the base bonding surface 21 may comprise a number of different non-planar shapes, for ease of explanation of the explosion welding process described herein, the cladding layer 15 and the base bonding surface 21 in FIG. 1 is depicted as having a substantially constant curved shape. FIGS. 2 and 3 are infinitely narrow cut-away views of the apparatus in FIG. 1.

Prior to detonation, the cladding layer 15 is maintained at a substantially uniform standoff distance from the base layer 20. At least one spacing mechanism 27 may be used to maintain the standoff distance between the cladding layer 15 and the base layer 20. Even though the base bonding surface 21 and the cladding layer 15 have curved or irregular shapes, the standoff distance between the base layer 20 and the cladding layer 15 can be maintained as substantially uniform using one or more spacer mechanisms 27 because the cladding layer 15 has a shape that substantially conforms to the shape of the base bonding surface 21. Any type of method or mechanism may be used to maintain the standoff distance between the cladding layer 15 and the base layer 20.

A cladding layer 15 can comprise any metallic material, including but not limited to alloys. Wear-resistant and/or corrosion resistant cladding materials are contemplated as cladding layers 15. Alloys suitable for use for piston rods in the transportation industry are also contemplated as cladding layers 15. Suitable alloys may include two or more of cobalt, chromium, manganese and molybdenum. Suitable alloys may include, at least, alloys of the compositions listed below, where the percentages are listed by weight with 100% being the weight of the entire alloy.

Alloy Composition 1

| Component | Wt. % |
|---|---|
| C | 0.9-1.4 |
| Co | Balance |
| Cr | 28-32 |
| Fe | Max. 3 |
| Mn | Max. 2 |
| Mo | Max. 1.5 |
| Ni | Max. 3 |
| Si | Max. 2 |
| W | 3.5-5.5 |

Alloy Composition 2

| Component | Wt. % |
|---|---|
| B | Max. 0.007 |
| C | 0.25 |
| Co | Balance |
| Cr | 27 |
| Fe | 1.5 |
| Mo | 5.5 |
| Ni | 2.75 |
| Si | 0.75 |

Alloy Composition 3

| Component | Wt. % |
|---|---|
| C | 2.5 |
| Co | Balance |
| Cr | 30-33 |
| Fe | Max. 3 |
| Mn | 0.5 |
| Mo | 13 |
| Ni | Max. 3 |
| Si | 0.5 |

Alloy Composition 4

| Component | Wt. % |
|---|---|
| C | 3.3 |
| Co | Balance |
| Cr | 26 |
| Fe | 8 |
| Mn | 0.5 |
| Mo | 14 |
| Ni | 1 |
| Si | 0.5 |

Alloy Composition 5

| Component | Wt. % |
|---|---|
| C | Max. 0.01 |
| Cr | 19.0-23.0 |
| Fe | Max. 2.0 |
| Mn | Max. 0.75 |
| Mo | 15.0-17.0 |
| Ni | Balance |
| P | Max. 0.04 |
| S | Max. 0.02 |
| Si | Max. 0.08 |
| Ti | 0.02-0.25 |
| W | 3.0-4.4 |

Alloy Composition 6

| Component | Wt. % |
|---|---|
| C | Max. 0.01 |
| Co | Max. 2.5 |
| Cr | 14.5-16.5 |
| Fe | 4.0-7.0 |
| Mn | Max. 1.0 |
| Mo | 15.0-17.0 |
| Ni | Balance |
| P | Max. 0.04 |
| S | Max. 0.02 |
| Si | Max. 0.08 |
| Ti | 0.02-0.25 |
| V | Max. 0.35 |

Alloy Composition 7

| Component | Wt. % |
|---|---|
| Al | Max. 0.40 |
| C | Max. 0.10 |
| Co | Max. 1.0 |
| Cr | 20.0-23.0 |
| Fe | Max. 5.0 |
| Mn | Max. 0.50 |
| Mo | 8.0-10.0 |
| Nb (+Ta) | 3.15-4.15 |
| Ni | Balance |
| P | Max. 0.015 |
| S | Max. 0.015 |
| Si | Max. 0.50 |
| Ti | Max. 0.40 |

Alloy Composition 8

| Component | Wt. % |
|---|---|
| C | 0.08 |
| Cr | Max. 18 |
| Fe | Balance |
| Mn | 2 |
| Mo | Max. 3 |
| Ni | Max. 14 |
| P | 0.045 |
| S | 0.03 |
| Si | 1 |

| Alloy Composition 9 | |
| --- | --- |
| Component | Wt. % |
| C | Max. 0.03 |
| Cr | 24.0-26.0 |
| Cu | 0.5-1.0 |
| Mn | Max. 1.0 |
| Mo | 3.0-4.0 |
| N | 0.20-0.30 |
| Ni | 6.0-8.0 |
| P | Max. 0.03 |
| S | Max. 0.01 |
| Si | Max. 1.0 |
| W | 0.5-1.0 |
| Others | Cr + 3.3 × % Mo + 16 × % N = Min. 40 |

| Alloy Composition 10 | |
| --- | --- |
| Component | Wt. % |
| Al | 5.5-6.75 |
| V | 3.5-4.5 |
| N | Max. 0.05 |
| C | Max. 0.08 |
| O | Max. 0.20 |
| Fe | 0.25-0.40 |
| H | 0.015-0.025 |
| Ti | Balance |

| Alloy Composition 11 | |
| --- | --- |
| Component | Wt. % |
| C | Max. 0.08 |
| Cr | 15.5-17.5 |
| Cu | 3.0-5.0 |
| Fe | Balance |
| Mn | Max. 1.0 |
| Ni | 3.0-5.0 |
| P | Max. 0.04 |
| S | Max. 0.04 |
| Si | Max. 1.0 |

| Alloy Composition 12 | |
| --- | --- |
| Component | Wt. % |
| C | 0.06 |
| Co | Balance |
| Cr | 26 |
| Fe | 3 |
| Mn | 0.8 |
| Mo | 5 |
| N | 0.08 |
| Ni | 9 |
| Si | 0.3 |
| W | 2 |

The base layer 20 may comprise any metallic material, whether it is similar or dissimilar to the metallic material comprising the cladding layer 15. Suitable alloys for the base layer may include, but are not limited to, the alloy of the composition listed below.

| Component | Wt. % |
| --- | --- |
| C | Max. 0.22 |
| Si | Max. 0.55 |
| Mn | Max. 1.60 |
| P | Max. 0.035 |
| S | Max. 0.035 |
| Cr | Max. 0.30 |
| Mo | Max. 0.08 |
| Ni | Max. 0.30 |
| Al | Max. 0.02 |
| Cr + Mo + Ni | Max. 0.48 |
| Fe | Balance |

The base layer 20 may be solid or hollow. The base layer 20 may comprise a single metallic material throughout, or it may comprise one or more layers of different metallic materials.

An explosive composition 25 is applied to at least a portion of the outer surface of the cladding layer 15. Any explosive composition 25 suitable for use in explosion welding, generally, is suitable for use in the processes described herein. Such explosive compositions 25 generally have a substantially uniform explosion energy E and a substantially uniform detonation velocity $v_d$ associated therewith. The explosive composition 25 is functionally connected with a detonation system including a detonator 30 capable of controlled detonation. Any detonation system suitable for use in explosion welding, generally, is suitable for use in the processes described herein. In one illustrative approach, a high velocity explosive booster is used as part of the detonation system for ignition or initiation of detonation.

An explosive containment mechanism (shown schematically as element 32 in FIG. 7) may also be applied to the outer surface 16 of the cladding layer 15 to define an explosion region. Any explosive containment mechanism 32, chemical or physical or both, that is suitable for use in explosion welding, generally, is suitable for use in the processes described herein. The explosive containment mechanism 32 may be arranged in any configuration. In one approach where the cladding layer 15 has a rectangular or substantially rectangular shape with longitudinal edges and lateral edges, the explosive containment mechanism 32 is substantially coextensive with a region extending between the lateral and longitudinal edges of the cladding layer 15.

Prior to detonation, one or both of the cladding bonding surface 17 and the base bonding surface 21 may be pre-treated to achieve a substantially uniform finish. The pre-treatment may include polishing or grinding or otherwise treating (whether chemically or physically) the cladding bonding surface 17. A substantially uniform finish may have a roughness Ra of less than about 3.2 μm. When Ra is less than about 3.2 μm or less than about 3.0 μm, the energy required to create the metal-to-metal bond from explosion welding may be reduced.

FIGS. 2 and 3 depict a simplified theoretical view of physical events occurring following the ignition or initiation of detonator 30. Although FIGS. 2 and 3 depict a linear detonation path (indicated with an arrow in FIG. 2) for explanatory purposes, no three infinitely narrow detonation paths could fall in the same plane, because the infinitely narrow detonation paths are distributed along a curve, as depicted in FIG. 1. Such a curved distribution offsets each theoretical infinitely narrow detonation path, making the interaction between any number of offset infinitely narrow detonation paths unpredictable because of the three-dimensional and high pressure nature of an explosion, as explained below.

After the detonator 30 is ignited or initiated, the explosive composition 25 explodes and the explosion acts as a mobile energy source, moving across a non-planar detonation path away from the point of ignition or initiation. As explosion occurs, material comprising the cladding layer 15 collides with the bonding surface 21 of the base layer 20, resulting in an impact. The impact occurs at high pressure, and causes spalling of at least one of the cladding bonding surface 17 and the base bonding surface 21. Particles created from spalling are ejected away in a jet (sometimes referred to as ejected plasma) that travels quickly and in three dimensions by the high pressure resulting from the explosion. The jet consumes and ejects any spacer mechanisms 27 as well as any surface contaminants on the cladding bonding surface 17 or the base bonding surface 21. The non-planar apparatus including the cladding layer 15 and cladding layer 20 must be designed to allow sufficient space for gases and ejected materials traveling at a high velocity at a high temperature to escape the apparatus 10. The jet has the effect of cleaning the metallic materials from the cladding layer 15 and the base layer 20, preparing the materials to be metallurgically joined or bonded.

The pressure caused by the explosion can range from about 1 GPa to about 10 GPa, and can cause metallic materials to behave as viscous fluids. This fluid-like behavior causes a wave-like pattern bond line 28 to form between the cladding layer 15 and the base layer 20, as depicted in FIG. 2. The bond line 28 is where the metallurgical bonds form between the cladding layer 15 and the base layer 20.

Although there is much heat generated using an explosion welding process, the process results in metal-to-metal bonds along the bond line 28 between the material comprising the cladding layer 15 and the material comprising the base layer 20, with little to no melting or diffusion.

FIG. 3 is designed to assist in the selection of impact parameters for the explosion welding processes disclosed herein. As is well known, impact parameters for a specific combination of metallic materials are dependent upon the specific metallic materials to be explosion welded and their associated properties, including chemical and mechanical properties.

Detonation rate $v_d$ is an independent variable representing the velocity at which detonation occurs along the non-planar detonation path. Different explosive compositions 25 may be selected for a desired quantity of explosion energy E to be released upon explosion, which impacts the detonation rate $v_d$. Similarly, the amount of explosive composition 25 applied to the outer surface of the cladding layer 15, per square meter, impacts the explosion energy E, which impacts the detonation rate $v_d$. The amount of explosive composition 25 applied to the outer surface of the cladding layer 15 should be determined based upon the desired explosion energy E and the unit area weight of explosive divided by the unit weight area of cladding material, the thickness of the cladding material t, as well as the physical and mechanical properties of the metallic materials to be explosion welded.

Typical detonation rates $v_d$ can range from, at the low end, from about 1500 m/s to about 2000 m/s to, at the higher end, from about 3500 m/s to about 4000 m/s. Detonation rates $v_d$ can be selected anywhere inside that range or outside of that range to achieve desired impact conditions. Detonation rates $v_d$ are selected to be subsonic to the acoustic velocities of the metallic materials to be bonded to create sufficient pressure to cause spalling.

Impact point velocity or collision point velocity $v_c$ is approximated to be about the same as the detonation rate $v_d$ because, pre-detonation, the shape of the cladding layer substantially correlates to the shape of the base bonding surface, even though neither is flat or planar.

The standoff distance is an independent variable, the value of which may be selected to ensure that cladding material from the cladding layer 15 collides with the base layer 20 at a particular collision point velocity $v_c$. Where the cladding layer 15 has a thickness t, the standoff distance may be selected to range from, at the low end, from about 0.3t to about 0.5t to, at the high end, from about 4t to about 5t, but any distance may be selected to achieve the desired $v_c$.

Cladding material from the cladding layer 15 collides with the base layer 20 at impact angle β. As the explosion travels, the explosion leaves behind a final cladding layer 18 bonded to a base layer 20 while a transition wall 19 of cladding material that travels with the explosion. Impact angle β is the angle between the transition wall 19 and the detonation path. Impact angle β is a dependent variable controlled by detonation rate $v_d$ and by the standoff distance. Typical impact angles β can range from, at the low end, from about 3° to about 5° to, at the high end, from about 25° to about 30°. Impact angles β vary depending upon the detonation rate $v_d$ and the standoff distance, and may fall inside or outside the typical range.

Figure 2A:
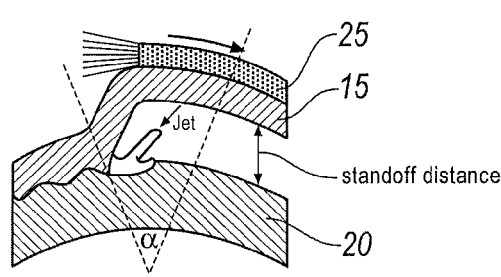
FIG. 2A is a schematic of a system for explosion welding using the system of FIG. 1 but having a detonation path perpendicular to that of FIG. 2.
Figure 3A:
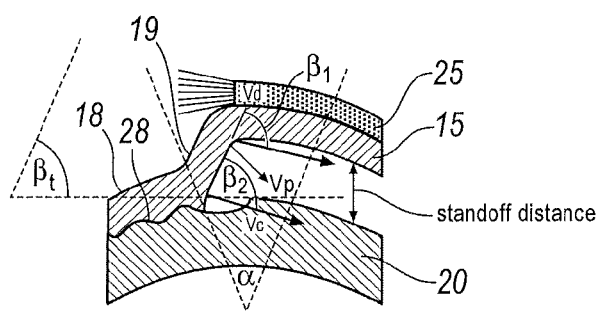
FIG. 3A is a schematic of a system for explosion welding using the system of FIG. 1 but having a detonation path perpendicular to that of FIGS. 2 and 3.

In an instance where a detonation path is set to run along a curve rather than perpendicular to a curve (as was shown in FIGS. 1-3), a calculated impact angle β will understate an actual impact angle. This is shown in FIG. 2A and FIG. 3A. In FIGS. 2A and 3A, theoretical impact angle $β_t$ lies between the transition wall 19 of cladding layer 15 and a linear detonation path. This angle understates an actual impact angle where cladding layer 15 and base layer 20 share substantially the same shape and share a common axis. Two radii extending from the common axis at angle α would cut a section of base layer 20 having a first curvature and an arc of cladding layer 15 having a second curvature. The greater the stand-off distance, the greater the difference in curvature. The actual impact angle β would reflect a relationship between a first impact angle $β_1$, which falls between the transition wall 19 and a tangent on the curve of the cladding layer 15 (which is greater than $β_t$), and a second impact angle $β_2$, which falls between the transition wall and a tangent on the curve of the base layer 20 (which is greater than $β_1$).

Impact conditions are generally associated with the following equation: $v_p = 2 v_c \sin(β/2)$, where $β_p$ represents plate collision velocity. Typical plate collision velocity can range from, at the low end, from about 225 m/s to about 250 m/s to, at the high end, from about 500 m/s to about 550 m/s. If higher or lower values are desired for a particular application, detonation rate $v_d$ and the standoff distance may be selected to produce a $v_p$ outside of the typical range.

Figure 4:
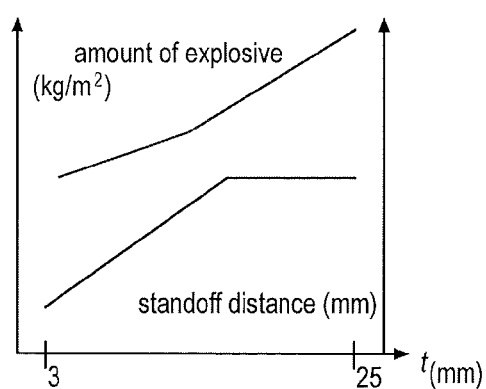
FIG. 4 is graph for guidance in the selection of a quantity of an explosive composition.

Indeed, referring to FIG. 4, while developing and/or testing an explosion welding process, the quantity of explosive composition 25, the detonation rate $v_d$ and the standoff distance may be adjusted to achieve particular impact parameters. As can be seen from FIG. 4, generally, the greater the thickness t of the cladding layer 15, the greater the desired standoff distance, until thickness t ranges from about 12 mm to about 15 mm, at which point the desired standoff distance plateaus relative to t. Also, generally, the desired quantity of explosive composition 25 increases with t at a certain slope, and after crossing a certain threshold, the desired quantity increases with t an increased slope. The threshold shown on FIG. 4 is from about 10 mm to about 14 mm.

Other considerations can be taken into account when developing and/or testing an explosion welding process. It may be helpful in a commercial manufacturing process to control explosion energy E and detonation rate $v_d$ within tight tolerances because certain metal combinations achieve metallurgical bonding only within a narrow range of detonation rates $v_d$ without heat transfer occurring and causing undesired melting and/or diffusion. Additionally, non-uniformity in the explosion can affect the jet, which in turn can affect the quality of the metal-to-metal bond between the cladding layer 15 and the base layer 20.

Referring to FIGS. 2-3, the bond line 28 between the cladding layer 15 and the base layer 20 is generally shaped like a wave. Generally, the wave properties of the bond line 28 can be engineered according the following formula: $\lambda = k\ t\ \sin^2(\beta/2)$, where k is a constant that varies with different metallic materials. The wave shape can have nearly perfect symmetry when the cladding layer 15 and the base layer 20 are comprised of metallic materials having similar densities.

Additionally, if the detonation rate $v_d$ is higher than desired, it can cause melting at the vortex of the wave, thereby potentially weakening the metallurgical bond. The metallurgical bond that forms between the cladding layer 15 and the base layer 20 is typically stronger than the strength of the weaker metallic material. Bond strength can be ascertained by shear testing, peal testing, bending testing, or other tests. Bond integrity can be ascertained using an ultrasonic test, among other well-known tests.

Additionally, explosion welding can impact the mechanical properties of the metallic material comprising the base layer 20. Thus, in certain applications, testing of the final explosion welded article may be conducted to verify strength for a particular application.

Figure 5:
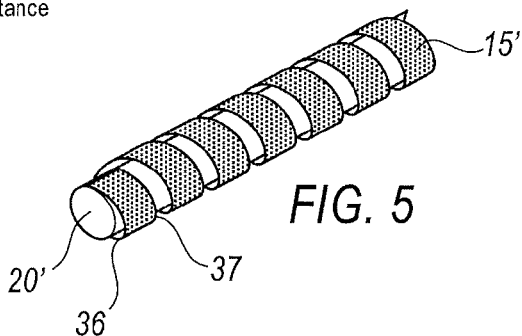
FIG. 5 is a perspective view of a strip of cladding material wrapped around a base layer.
Figure 6:
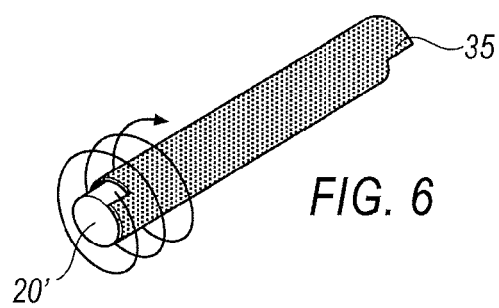
FIG. 6 is a perspective view of a precision welded cladding cover substantially surrounding a base layer.

Referring to FIGS. 5 and 6, a method is shown for adapting an explosion welding process typically applied to a flat or planar base layer so that the explosion welding process can work with a non-planar cladding layer 15' and a non-planar base layer 20'. In FIG. 5, the cladding layer 15' is in the form of a strip having a first longitudinal edge 36 and a second longitudinal edge 37. The strip is wrapped around the base layer 20 in a substantially spiral configuration. Unlike the case when explosion welding is applied to planar surfaces, efforts may be necessary to form the substantially spiral configuration so that it substantially conforms to the shape of the base layer 20'.

The base layer 20' is shown in the form of a solid rod. The cladding layer 15' is offset from the base layer 20' to a selected standoff distance, using one or more spacer mechanisms 27 that are not shown in FIG. 5. Unlike the case when explosion welding is applied to planar surfaces, efforts may be necessary to keep the substantially spiral configuration at a standoff distance from base layer 20'. Inserting spacer mechanism 27 and keeping spacer mechanisms 27 in place on a non-planar base layer 20' will need to be customized based on the particular materials being used and the nature of the coating required.

At the point in the preparation process for explosion welding depicted in FIG. 5, no explosive composition 25 has been deposited onto the outer surface of the cladding layer 15'. In FIG. 6, it is shown that at least a portion of the first longitudinal edge 36 of the strip of cladding is processed (by any known means including precision welding) to at least a portion of the second longitudinal edge 37 of the strip of cladding to form a substantially continuous cladding cover layer 35 that substantially surrounds the base layer 20'. A precision weld can be performed using any technique that is precise and that involves low heat input, such as laser-welding. Unlike the case when explosion welding is applied to planar surfaces, consideration of other factors such as those discussed above may be necessary to form a substantially spiral configuration such that it can be processed to form a cladding cover layer 35. After the cladding cover layer 35 is formed, then an explosive composition 25 may be deposited on the outer surface of the cladding cover layer 35. A detonation system may be set up with the explosive composition 25, and the explosion welding process may occur.

Figure 7:
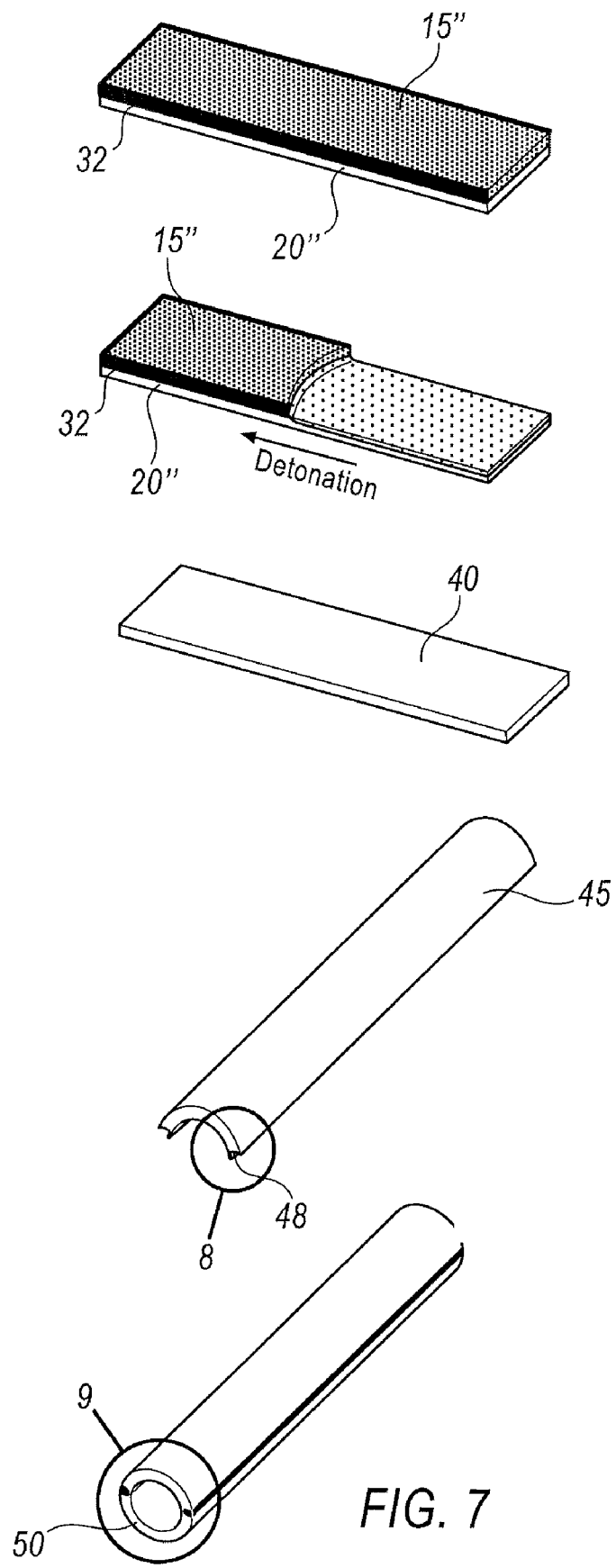
FIG. 7 is a schematic view of a process for forming an explosion welded article having a shape including a curve.
Figure 8:
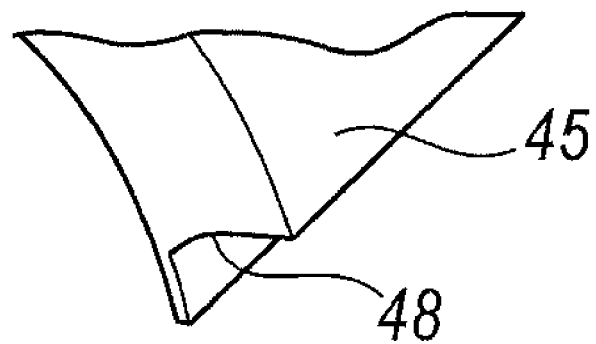
FIG. 8 is a perspective view of a machined and bent explosion welded article.
Figure 9:
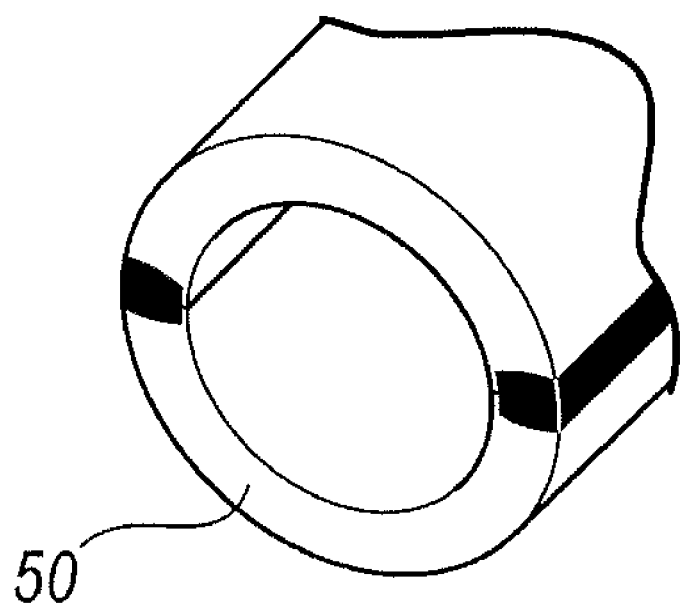
FIG. 9 is a perspective view of two machined and bent explosion welded articles that have been welded together and post-machined to have the shape of a hollow cylinder.

In FIGS. 7-9, another exemplary method of forming an explosion welded article that is not flat or planar is shown. FIG. 7 depicts five steps in the method, although it is contemplated that steps could be combined or that additional steps could be added to the process. First, an apparatus is provided that comprises a substantially flat and/or planar base layer 20" that is off-set at a selected standoff distance from a substantially flat and/or planar cladding layer 15" using one or more spacer mechanisms. The cladding layer 15" carries an explosive composition and a detonation system (not shown). Second, the detonation system is initiated or ignited, and the explosion welding process occurs. Third, a substantially flat and/or planar explosion welded article 40 is formed. Fourth, one or more explosion welded articles 40 are pre-machined by modifying the surface of the explosion welded articles 40 to make said articles more readily reshaped. The nature of the modification can be any known modification, for example, the modification can comprise creating at least one weld groove 48 or the like. In FIG. 7, the one or more explosion welded articles 40 are bent to about 180° to form explosion welded article 45. In FIG. 7, a cross-section of explosion welded article 45 is substantially C-shaped or U-shaped. However, it is contemplated that the one or more explosion welded articles 40 could be bent (or reshaped using any process) to take on nearly any shape or form. Fifth, in FIG. 7, two welded articles 45 that are bent to about 180° are welded together and post-machined or otherwise post-treated to create a hollow substantially cylindrical explosion welded article 50 having the desired physical and mechanical properties for a particular application. It is contemplated that any number of explosion welded articles could be welded together to form virtually any shape, depending upon the desired application.

The present invention of the appended claims has been particularly shown and described with reference to the foregoing exemplary embodiments, which are merely illustrative of the best modes for carrying out the invention of the appended claims. It should be understood by those skilled in the art that various alternatives to the exemplary embodiments described herein may be employed in practicing the invention without departing from the spirit and scope of the invention as defined in the following claims. It is intended that the following claims define the scope of the invention and that the method and apparatus within the scope of these claims and their equivalents be covered thereby. This description of the drawings should be understood to include all novel and non-obvious combinations of elements described herein, and claims may be presented in this or a later application to any novel and non-obvious combination of these elements. Moreover, the foregoing exemplary embodiments are illustrative, and no single feature or element is essential to all possible combinations that may be claimed in this or a later application.

What is claimed is:

1. A method of preparing an apparatus for explosion welding, the method comprising:
    placing a non-planar cladding layer about a non-planar outer surface of a base to be explosion welded in a spaced-apart configuration at a pre-determined standoff distance from the surface of the base;
    low heat welding the spaced-apart configuration to form a cladding cover layer conforming substantially in shape with the surface of the base; and placing at least one explosive composition on at least a portion of an outer surface of the cladding cover layer, thereby setting a non-planar detonation path along which detonation will occur at a predetermined detonation rate to bond the cladding cover layer to the surface of the base.

2. The method of claim 1, further comprising inserting at least one spacer mechanism for maintaining the pre-determined standoff distance.

3. The method of claim 1, wherein the layer is substantially cylindrical in shape.

4. The method of claim 3, wherein the placing a non-planar cladding layer step further comprises shaping the non-planar cladding layer around the substantially cylindrical base and forming a spaced-apart substantially spiral configuration.

5. The method of claim 4, wherein the low heat welding step further comprises precision welding the spaced-apart substantially spiral configuration of cladding to form the cladding cover layer.

6. A method of forming an explosion welded article, the method comprising preparing an apparatus according to the method of claim 1; and detonating the explosive composition, causing an explosion to travel along the non-planar detonation path.

7. The method of claim 1 wherein the low heat welding step comprises precision welding the spaced-apart configuration of cladding layer to form the cover layer.

8. A method of preparing an apparatus for explosion welding, the method comprising:

placing cladding material about an outer surface of a substantially cylindrical base to be explosion welded in a spaced-apart spiral configuration at a pre-determined standoff distance from the outer surface of the base;

low heat welding the spaced-apart spiral configuration to form a substantially contiguous cladding cover layer conforming substantially in shape with the outer surface of the base; and placing at least one explosive composition on at least a portion of an outer surface of the cladding cover layer, thereby setting a non-planar detonation path.

* * * * *